United States Patent
Bae et al.

(10) Patent No.: US 12,234,330 B2
(45) Date of Patent: Feb. 25, 2025

(54) METHOD FOR MANUFACTURING STRETCHABLE ELECTROCHROMIC DEVICE, AND STRETCHABLE ELECTROCHROMIC DEVICE MANUFACTURED THEREBY

(71) Applicant: KOREA UNIVERSITY OF TECHNOLOGY AND EDUCATION INDUSTRY-UNIVERSITY COOPERATION FOUNDATION, Cheonan-si (KR)

(72) Inventors: Jin Woo Bae, Seoul (KR); Seung Ju Oh, Cheonan-si (KR)

(73) Assignee: KOREA UNIVERSITY OF TECHNOLOGY AND EDUCATION INDUSTRY-UNIVERSITY COOPERATION FOUNDATION, Cheonan-si (KR)

( * ) Notice: Subject to any disclaimer, the term of this patent is extended or adjusted under 35 U.S.C. 154(b) by 73 days.

(21) Appl. No.: 18/235,348

(22) Filed: Aug. 18, 2023

(65) Prior Publication Data
US 2024/0199823 A1  Jun. 20, 2024

Related U.S. Application Data

(63) Continuation of application No. PCT/KR2023/001974, filed on Feb. 10, 2023.

(30) Foreign Application Priority Data

Dec. 8, 2022  (KR) ........................ 10-2022-0170287

(51) Int. Cl.
*C08J 3/11* (2006.01)
*C08J 3/215* (2006.01)

(52) U.S. Cl.
CPC ................. *C08J 3/11* (2013.01); *C08J 3/215* (2013.01); *C08J 2327/06* (2013.01)

(58) Field of Classification Search
None
See application file for complete search history.

(56) References Cited

U.S. PATENT DOCUMENTS

2011/0222139 A1  9/2011  Naijo et al.
2016/0146994 A1  5/2016  Kim et al.

FOREIGN PATENT DOCUMENTS

| KR | 10-1109253 B1 | 1/2012 |
| KR | 10-2015-0122319 A | 11/2015 |
| KR | 10-2017-0115864 A | 10/2017 |
| KR | 10-2038495 B1 | 10/2019 |

*Primary Examiner* — Michael P. Rodriguez
(74) *Attorney, Agent, or Firm* — Revolution IP, PLLC (57) ABSTRACT

The present invention relates to a method for manufacturing a stretchable electrochromic device and a stretchable electrochromic device manufactured thereby, and more specifically, the present invention is characterized in that a stretchable electrochromic device, which is manufactured by stretching color changeable polymer gel, and then coating one surface and/or the other surface thereof with a metal solution, has excellent water resistance and initial transmittance.

17 Claims, 7 Drawing Sheets

METHOD FOR MANUFACTURING STRETCHABLE ELECTROCHROMIC DEVICE, AND STRETCHABLE ELECTROCHROMIC DEVICE MANUFACTURED THEREBY

ACKNOWLEGEMENT

This patent is the result of the 'applications of next-generation transparent stretchable sensor and electrochemical display device using non-water based, high-performance, and multifunctional ion-conducting ·nonion-conducting polymer gels' of the National Research Foundation of Korea (NRF-2021R1A2C2011898).

TECHNICAL FIELD

The present invention relates to a method for manufacturing a stretchable electrochromic device and a stretchable electrochromic device manufactured thereby, and more specifically, the present invention is characterized in that a stretchable electrochromic device, which is manufactured by stretching color changeable polymer gel, and then coating one surface and/or the other surface thereof with a metal solution, has excellent water resistance and initial transmittance.

BACKGROUND ART

Electrochromism is a phenomenon that a color is reversibly changed by an electric field direction when a voltage is applied, and a material having such properties, whose optical properties can be reversibly changed by an electrochemical redox reaction, is referred to as an electrochromic material. Such an electrochromic material is colorless when an electrical signal is not applied from the outside, and then becomes colored when an electrical signal is applied, or conversely, is colored when a signal is not applied from the outside, and then loses the color when a signal is applied.

An electrochromic device is a device in which the light transmission properties of an electrochromic material are changed due to the color change of the electrochromic material by an electrochemical redox reaction according to the application of a voltage. At present, in various technical fields, there is an increasing demand for an electrochromic device that can selectively transmit light. Such an electrochromic device can be applied to various fields such as smart windows, smart mirrors, display devices, and camouflage devices.

Accordingly, various technologies related to an electrochromic device are being developed. For example, Korean Patent Publication No. 10-2017-0115864 (Application No. 10-2016-0043619, applicant: LG Electronics Co., Ltd.) relates to an electrochromic element with an improved color changing speed. The present invention provides an electrochromic element including a first transparent electrode, a second transparent electrode facing the first transparent electrode, a first bus electrode having a predetermined pattern and formed on an upper surface of the first transparent electrode, an electrolyte layer positioned between the first bus electrode and the second transparent electrode, a first electrochromic layer positioned between the first transparent electrode and the electrolyte layer, and in contact with the electrolyte layer, and a passivation layer formed between the first bus electrode and the electrochromic layer and surrounding the first bus electrode to prevent contact between the first bus electrode and the electrochromic layer.

However, since the electrochromic device (element) or a color changing element using polymer gel generally has degraded stability against water, research to overcome the stability issue is continuously being conducted.

DISCLOSURE OF THE INVENTION

Technical Problem

The present invention provides a method for manufacturing a stretchable electrochromic device having excellent stability against water.

In addition, the present invention provides a stretchable electrochromic device manufactured through the method for manufacturing a stretchable electrochromic device.

In addition, the present invention provides a product including the stretchable electrochromic device.

Technical Solution

As a technical means for achieving the above-described technical task, an aspect of the present invention provides a method for manufacturing a stretchable electrochromic device, the method including
stretching polymer gel, coating a metal solution on one surface of the stretched polymer gel, and restoring the stretched polymer gel to its original state.

The polymer gel may include a polymer resin, a plasticizer, an ionic liquid, a color changing material, and a reducing agent.

The polymer resin may include a polymer resin selected from the group consisting of polyvinyl chloride (PVC), polytetrafluoroethylene (PTFE), polyurethane (PU), polymethyl methacrylate (PMMA), polydimethylsiloxane (PDMS), polyvinyl alcohol (PVA), polyvinylpyrrolidone (PVP), polyethylene oxide (PEO), polyimide (PI), polyethylene terephthalate (PET), and combinations thereof.

The ionic liquid may include an ionic liquid selected from the group consisting of a neutral liquid, an anionic liquid, a cationic liquid, and combinations thereof.

The neutral liquid may include a neutral liquid selected from the group consisting of 1-ethyl-3-methylimidazolium bis(trifluoromethylsulfonyl)imide (Emim TFSI), 1-methyl-3-propylimidazolium iodide (MPII), 1-ethyl-3-methylimidazolium tetrafluoroborate ($EMIBE_4$), 1-ethyl-3-methylimidazolium trifluoromethanesulfonate (EMITf), 1-ethyl-3-methylimidazolium hydrogensulfate ($EMIHSO_4$), N-methyl-N-butylpyrrolidinium bis(trifluoromethanesulfonyl)imide (PYRTFSI), and combinations thereof.

The anionic liquid may include an anionic liquid selected from the group consisting of trifluoroacetate ($[tfa]^-$), trifluoromethanesulfonate ($[CF_3SO_3]^-$), bis(fluorosulfonyl)imide ($[N(SO_2F)_2]^-$), bis(trifluoromethanesulfonyl)imide ($[N(SO_2CF_3)_2]^-$), dicyanamide ($[N(CN)_2]^-$), tetracyanoborate ($[B(CN)_4]^-$), dihydrogenphosphate ($[H_2PO_4]^-$), hydrogen sulfate ($[HSO_4]^-$), and combinations thereof.

The cationic liquid may include a cationic liquid selected from the group consisting of imidazolium, pyrrolidinium, piperidinium alkylmethylimidazolium, and combinations thereof.

Based on 100 parts by weight of the polymer resin, the content of the ionic liquid may be 40 parts by weight to 140 parts by weight, the content of the plasticizer may be 300 parts by weight to 1,500 parts by weight, and the contents of the color changing material and the reducing agent may be respectively 10 parts by weight to 140 parts by weight.

The polymer gel may be stretched by 20% to 80% with respect to the length of the polymer gel.

The metal solution may include a solution of a metal selected from a group consisting of silver (Ag), gold (Au), platinum (Pt), palladium (Pd), iridium (Ir), rhodium (Rh), ruthenium (Ru), osmium (Os) and combinations thereof.

The concentration of the metal solution may be 1 mg/mL to 20 mg/mL.

The method for manufacturing a stretchable electrochromic device may further include, after the coating of the metal solution on one surface of the stretched polymer gel, spraying water on one surface of the polymer gel coated with the metal solution and performing annealing.

The annealing may be performed for 10 seconds to 1 minute.

The restoring of the polymer gel to its original state may be performed at a rate of 0.01 mm/s to 5.0 mm/s.

The method for manufacturing a stretchable electrochromic device may further include, after the restoring of the stretched polymer gel to its original state, performing the same processes on the other surface of the polymer gel.

In addition, another aspect of the present invention provides
a stretchable electrochromic device manufactured through the method for manufacturing a stretchable electrochromic device, and a product including the stretchable electrochromic device.

Advantageous Effects

A stretchable electrochromic device manufactured by a method for manufacturing a stretchable electrochromic device according to the present invention as described above is manufactured by stretching color changeable polymer gel, and then coating one surface and/or the other surface thereof with a metal solution, and thus, may have excellent stability against water.

In addition, the stretchable electrochromic device may have excellent initial transmittance, and may maintain the performance as a stretchable electrochromic device due to the stability in any deformation.

MODE FOR CARRYING OUT THE INVENTION

Hereinafter, the present invention will be described in more detail. However, the present invention may be implemented in various different forms, and the present invention is not limited by the embodiments described herein, and the present invention is only defined by the claims to be described later.

In addition, the terms used in the present invention are only used to describe specific embodiments, and are not intended to limit the present invention. Singular expressions include plural expressions unless the context clearly indicates otherwise. Throughout the specification of the present invention, when a certain component is "included," it means that, unless specifically stated otherwise, other components may be further included, rather than excluding other components.

The first aspect of the present application provides
a method for manufacturing a stretchable electrochromic device, the method including stretching polymer gel, coating a metal solution on one surface of the stretched polymer gel, and restoring the stretched polymer gel to its original state.

Hereinafter, the method for manufacturing a stretchable electrochromic device according to the first aspect of the present application will be described in detail step by step with reference to FIGS. 1 and 2. At this time, FIG. 1 is a flowchart showing a method for manufacturing a stretchable electrochromic device according to an embodiment of the present invention, and FIG. 2 is a schematic diagram showing the method for manufacturing a stretchable electrochromic device according to the present invention.

Figure 1:
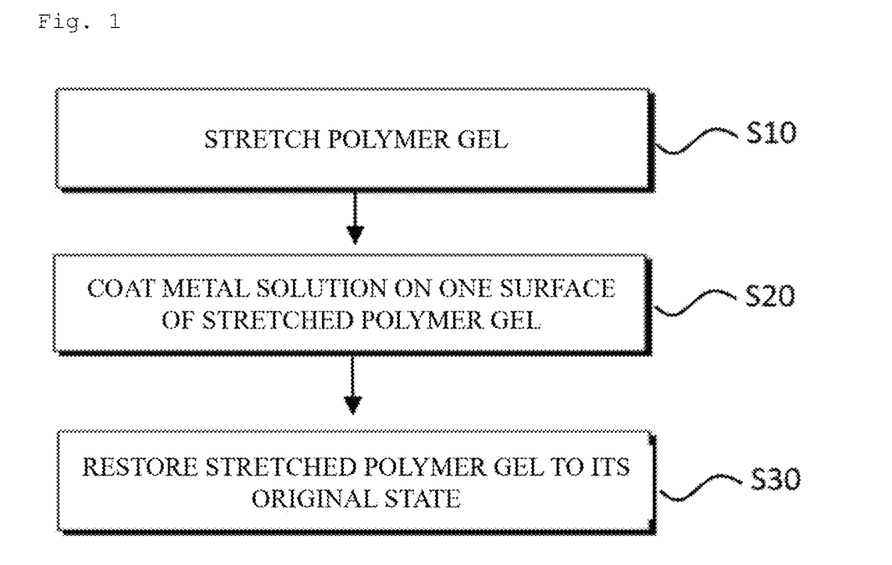
FIG. 1 is a flowchart showing a method for manufacturing a stretchable electrochromic device according to an embodiment of the present invention.
Figure 2:
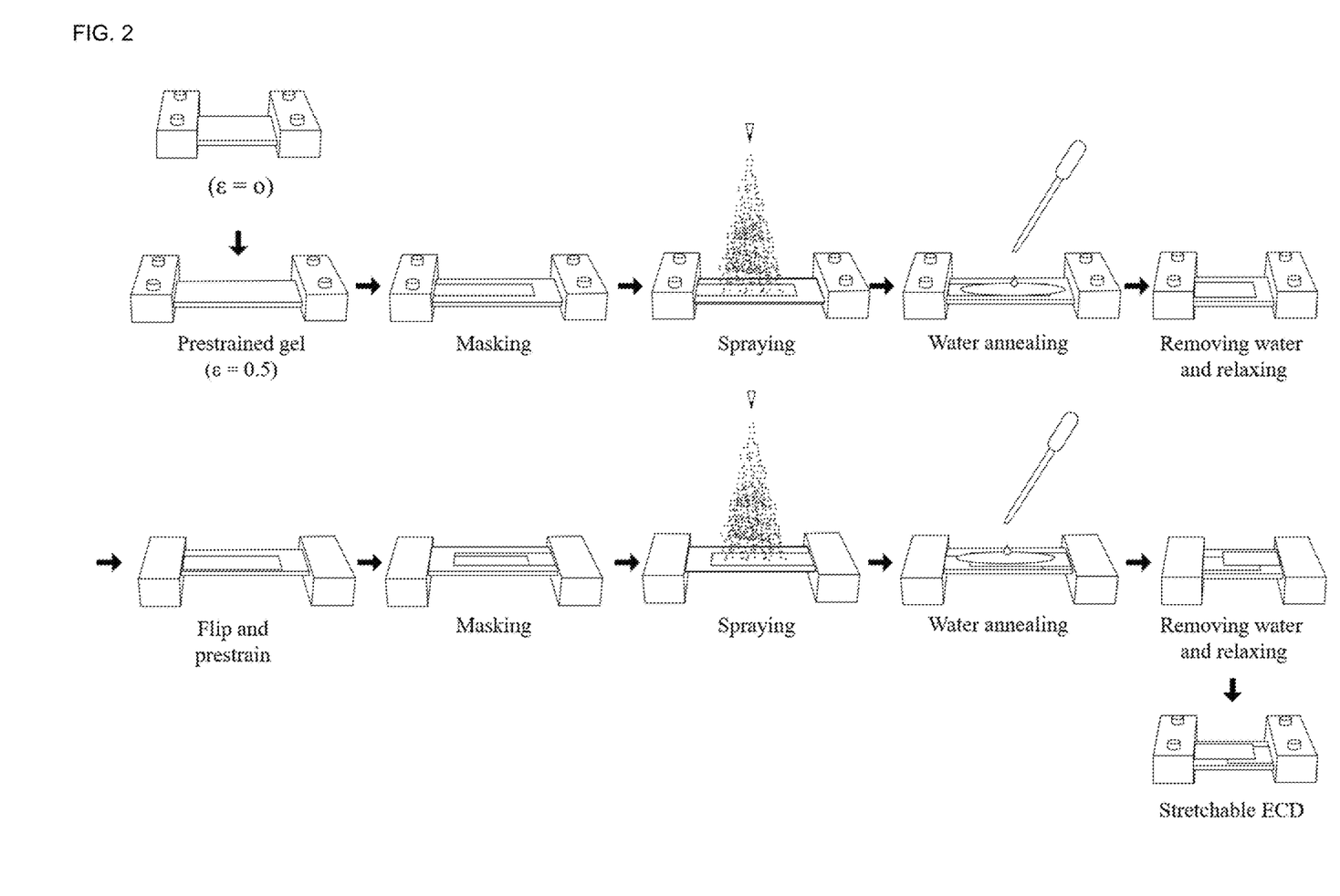
FIG. 2 is a schematic diagram showing a method for manufacturing a stretchable electrochromic device according to an embodiment of the present invention.

Meanwhile, the configurations respectively shown in FIGS. 1 and 2 are merely one implementation, and thus, it should be understood that any form of modification or substitution of components is included within a range that does not impair the scope of the present invention.

First, in an embodiment of the present application, the method for manufacturing a stretchable electrochromic device may include stretching polymer gel S10.

In an embodiment of the present application, the stretching of polymer gel may be to stretch the polymer gel by 20% to 80% with respect to the length of the polymer gel, and according to an embodiment of the present invention, the polymer gel may be stretched by 50%. At this time, the degree of stretching may be to stretch the polymer gel by a corresponding percent (%) with respect to the length of the original polymer gel, and for example, when the length of the polymer gel is 5 cm, and the polymer gel is stretched by 50%, the length of the stretched polymer gel may be 7.5 cm. Meanwhile, the stretching of the polymer gel may be to stretch the polymer gel by applying a certain force thereto in the longitudinal direction of the polymer gel, and in order to maintain the length of the stretched polymer gel, both ends thereof may be fixed.

In an embodiment of the present application, the polymer gel may include a polymer resin, a plasticizer, an ionic liquid, a color changing material, and a reducing agent.

In an embodiment of the present application, the polymer resin may be plasticized without a solvent, and may include a polymer resin selected from the group consisting of polyvinyl chloride (PVC), polytetrafluoroethylene (PTFE), polyurethane (PU), polymethyl methacrylate (PMMA), polydimethylsiloxane (PDMS), polyvinyl alcohol (PVA), polyvinylpyrrolidone (PVP), polyethylene oxide (PEO), polyimide (PI), polyethylene terephthalate (PET), and combinations thereof.

In an embodiment of the present application, the plasticizer may be a material for plasticizing the polymer resin at a constant temperature, and may have a flash point of 200° C. or higher. Meanwhile, according to an embodiment of the present invention, the plasticizer may be dibutyl adipate (DBA), and the dibutyl adiphate may be represented by Formula 1 below.

[Formula 1]

In an embodiment of the present application, the ionic liquid refers to a liquid including ions, and may include, for example, a neutral liquid, an anionic liquid, or a cationic liquid.

In an embodiment of the present application, the neutral liquid may include a neutral liquid selected from the group consisting of 1-ethyl-3-methylimidazolium bis(trifluoromethylsulfonyl)imide (Emim TFSI), 1-methyl-3-propylimidazolium iodide (MPII), 1-ethyl-3-methylimidazolium tetrafluoroborate ($EMIBF_4$), 1-ethyl-3-methylimidazolium trifluoromethanesulfonate (EMITf), 1-ethyl-3-methylimidazolium hydrogensulfate ($EMIHSO_4$), N-methyl-N-butylpyrrolidinium bis(trifluoromethanesulfonyl)imide (PYRTFSI), and combinations thereof.

In an embodiment of the present application, the anionic liquid may include an anionic liquid selected from the group consisting of trifluoroacetate ([tfa]$^-$), trifluoromethanesulfonate ([$CF_3SO_3$]$^-$), bis(fluorosulfonyl)imide ([$N(SO_2F)_2$]$^-$), bis(trifluoromethanesulfonyl)imide ([$N(SO_2CF_3)_2$]$^-$), dicyanamide ([$N(CN)_2$]$^-$), tetracyanoborate ([$B(CN)_4$]$^-$), dihydrogenphosphate ([$H_2PO_4$]$^-$), hydrogen sulfate ([$HSO_4$]$^-$), and combinations thereof.

In an embodiment of the present application, the cationic liquid may include a cationic liquid selected from the group consisting of imidazolium, pyrrolidinium, piperidinium alkylmethylimidazolium, and combinations thereof.

Meanwhile, according to an embodiment of the present invention, the ionic liquid may be 1-ethyl-3-methylimidazolium bis(trifluoromethylsulfonyl)imide (Emim TFSI), and may be represented by Formula 2 below.

[Formula 2]

In an embodiment of the present application, the color changing material may be a material used for changing the color of the polymer gel, and according to an embodiment of the present invention, DHV[TFSI]$_2$ may be used, but the embodiment of the present invention is not limited thereto. Meanwhile, the DHV[TFSI]$_2$ may be represented by Formula 3 below.

[Formula 3]

In an embodiment of the present application, the reducing agent is a material that reduces a target material, and according to an embodiment of the present invention, dimethyl ferrocene may be used, but the embodiment of the present invention is not limited thereto. Meanwhile, the dimethyl ferrocene may be represented by Formula 4 below.

[Formula 4]

In an embodiment of the present application, based on 100 parts by weight of the polymer resin, the content of the ionic liquid may be 40 parts by weight to 140 parts by weight, the content of the plasticizer may be 300 parts by weight to 1,500 parts by weight, and the contents of the color changing material and the reducing agent may be respectively 10 parts by weight to 140 parts by weight, and preferably, the content of the ionic liquid may be 100 parts by weight to 140 parts by weight, the content of the plasticizer may be 800 parts by weight to 1,000 parts by weight, and the contents of the color changing material and the reducing agent may be respectively 10 parts by weight to 120 parts by weight. Meanwhile, according n embodiment of the present invention, the weight content ratio of the polymer resin, the plasticizer, the ionic liquid, the color changing material, and the reducing agent may be 1:9:1.2:0.7061:0.1652. When the contents of the above constituent materials are out of the above ranges, there may be a problem in that the ionic conductivity, the rate of color change, the rate of color fading, and the like are degraded.

Next, in an embodiment of the present application, the method for manufacturing a stretchable electrochromic device may include coating a metal solution on one surface of the stretched polymer gel S20.

In an embodiment of the present application, the coating may be used without limitation as long as it is a typical coating method, and may be, for example, performed by spraying a metal solution in a spray manner.

In an embodiment of the present application, the metal solution may include a solution of a metal selected from a group consisting of silver (Ag), gold (Au), platinum (Pt), palladium (Pd), iridium (Ir), rhodium (Rh), ruthenium (Ru), osmium (Os) and combinations thereof, and preferably, a silver (Ag) nanowire solution may be used. At this time, when the silver (Ag) nanowire solution is used, a polymer such as polyvinylpyrrolidone (PVP) may be used in the manufacturing process, and the silver nanowire may have an average diameter of 30 nm and an average length of 20 um in size. Metal layer, the metal solution may refer to a solution in which the metals are dissolved in a solvent, and the solvent may be ethanol, water, isopropyl alcohol, and the like, but is not limited thereto, and ethanol is used according to an embodiment of the present invention. Meanwhile, the concentration of the metal solution may be 1 mg/mL to 20 mg/mL, preferably 1 mg/mL to 10 mg/mL, and may be about 5 mg/mL according to an embodiment of the present invention. When the concentration of the metal solution is less than 1 mg/mL, the content of a metal included in the solution is relatively too small, and as a result, the performance of the color changing element may be degraded, and when greater than 20 mg/mL, the content of a metal included in the solution is relatively too large, so that there may be a problem of degradation in dispersion stability.

Next, in an embodiment of the present application, the method for manufacturing a stretchable electrochromic device may include spraying water on one surface of the polymer gel coated with the metal solution and performing annealing.

In an embodiment of the present application, the spraying of water and the annealing may be simultaneously performed. In addition, the annealing may be performed for 10 seconds to 1 minute, preferably for 20 to 40 seconds, and may be performed for about 30 seconds according to an embodiment of the present invention. When the annealing is performed for less than 10 seconds, the duration may be too short, so that the annealing may not be sufficiently performed, and when performed more than 1 minute, there may be a problem in that the coated metal is desorbed.

Next, in an embodiment of the present application, the method for manufacturing a stretchable electrochromic device may include restoring the stretched polymer gel to its original state S30.

In an embodiment of the present application, the restoring step may be simultaneously performed with the annealing process, and may be a step of restoring the length of the stretched polymer gel back to its original length.

In an embodiment of the present application, the restoring of the polymer gel may be performed at a rate of 0.01 mm/s to 5.0 mm/s, but is not limited thereto, and may be performed at a rate that can be appropriately changed depending on the length of the original polymer gel.

Next, in an embodiment of the present application, the method for manufacturing a stretchable electrochromic device may further include performing the same processes (S10 to S30) on the other surface of the polymer gel.

In an embodiment of the present application, the above-described method for manufacturing a stretchable electrochromic device may be to coat the metal solution only on one surface of the polymer gel, but it may be possible to coat the metal solution on the other surface thereof.

More specifically, after the restoring of the stretched polymer gel to its original state, the method may further include re-stretching the restored polymer gel, coating the other surface of the re-stretched polymer gel with a metal solution, and restoring the re-stretched polymer gel. Therefore, as shown in FIG. 2, the stretchable electrochromic device may have a form in which the metal solution is coated on both surfaces of the polymer gel.

The second aspect of the present application provides
a stretchable electrochromic device manufactured through the method for manufacturing a stretchable electrochromic device according to the first aspect of the present application, and a product including the stretchable electrochromic device.

Although detailed descriptions of parts overlapping the first aspect of the present application have been omitted, the description of the first aspect of the present application may be equally applied to the second aspect even though the description is omitted.

Hereinafter, the stretchable electrochromic device and the product including the same according to the second aspect of the present application will be described in detail.

In an embodiment of the present application, the stretchable electrochromic device is manufactured by stretching color changeable polymer gel, and then coating on one surface and/or the other surface thereof with a metal solution, and thus, may have excellent stability against water. In addition, the stretchable electrochromic device may have excellent initial transmittance, and may smoothly maintain the performance a as a stretchable electrochromic device due to the stability in any deformation.

In an embodiment of the present application, the product including the stretchable electrochromic device may be applicable without limitation as long as it is a product that requires a stretchable electrochromic device, and for example, may be applicable to architectural window panes, smart windows, vehicle mirrors, displays, or electronic shelf labels (ESL).

Hereinafter, embodiments of the present invention will be described in detail so that those skilled in the art may easily carry out the present invention. However, the present invention may be embodied in many different forms, and is not limited to the embodiments set forth herein.

Example. Manufacturing of Stretchable Electrochromic Device Through Stretching

1. Preparation of PVC Color Changing Gel

Polyvinyl chloride (PVC) was added and dissolved in tetrahydrofuran (THF) being stirred at 400 rpm with a magnetic bar therein. 1-ethyl-3-methylimidazolium bis(trifluoromethylsulfonyl)imide [EMIM] [TFSI] as an ionic liquid, $DHV[TFSI]_2$ as a color changing material, and dimethyl ferrocene as a reducing agent were added to the solution, and then lastly, dibutyl adipate (DBA) as a plasticizer was added thereto, and the mixture was sufficiently stirred for 12 hours. At this time, the weight mixing ratio of the PVC, the DBA, the [EMIM] [TFSI], the $DHV [TFSI]_2$, and the dimethyl ferrocene was 1:9:1.2:0.7061:0.1652. Thereafter, the solution was poured into a petri dish and dried at room temperature for 48 hours to prepare PVC color changing gel.

2. Manufacturing of Stretchable Electrochromic Device

As shown in FIG. 2, a stretchable electrochromic device was manufactured. Specifically, the PVC color changing gel prepared in the above 1. was cut to a size of 5 cm×6 cm, and then manufactured into a thickness of 0.5 mm and stretched by 50% with respect to the original length.

Thereafter, a silver nanowire solution (concentration: 5 mg/mL) mixed in ethanol was put into an air spray and sprayed on one surface of the stretched PVC color changing gel to coat the silver nanowire (height: 15 cm/spray pressure: 1 psi).

Next, after the coated solution was dried, water was sprayed onto the coated surface to perform annealing for 30 seconds, and at the same time, the length of the stretched PVC gel was restored at a rate of 0.5 mm/s.

Lastly, a silver nanowire was also coated on the other surface of the PVC gel coated with the silver nanowire through the same processes to manufacture a stretchable electrochromic device.

Experimental Example 1. Evaluation of Resistance Against Water

Figure 3:
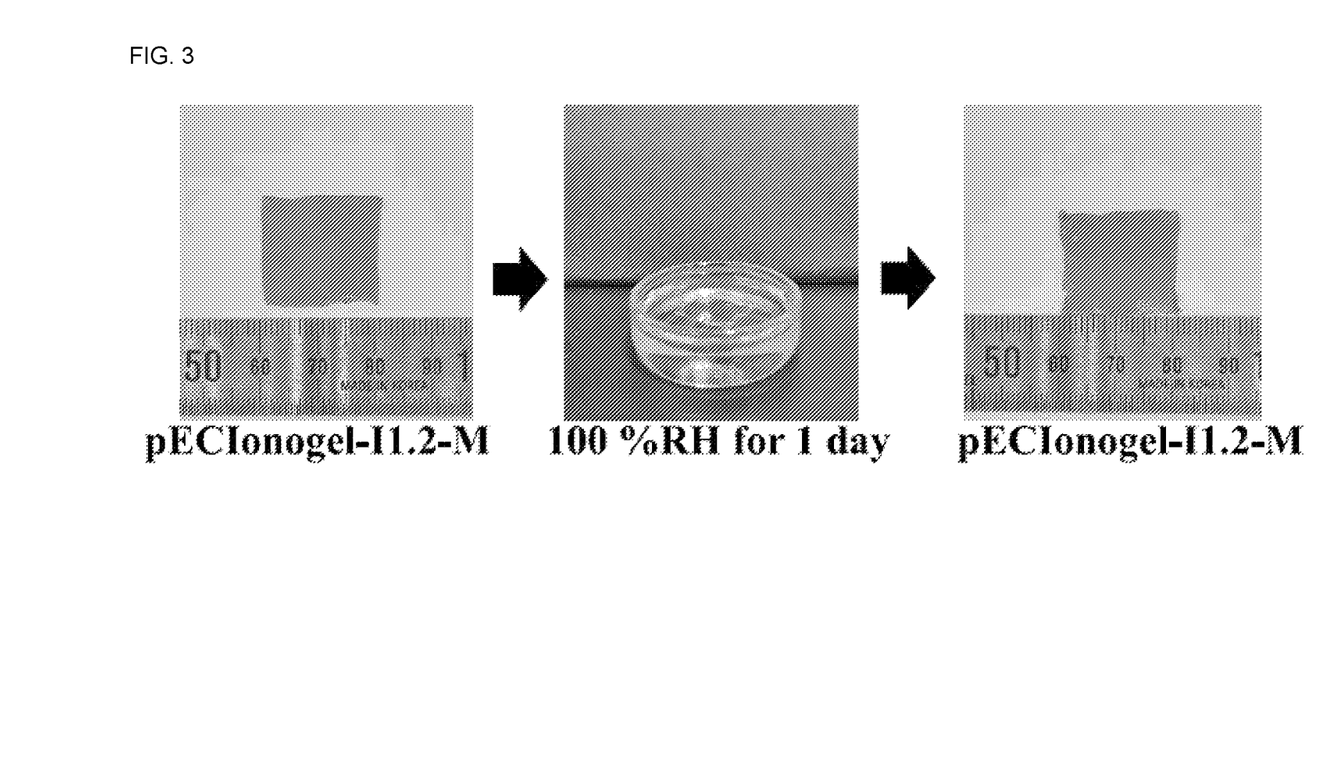
FIG. 3 is a photograph showing the water stability of a stretchable electrochromic device manufactured according to an embodiment of the present invention.
Figure 4:
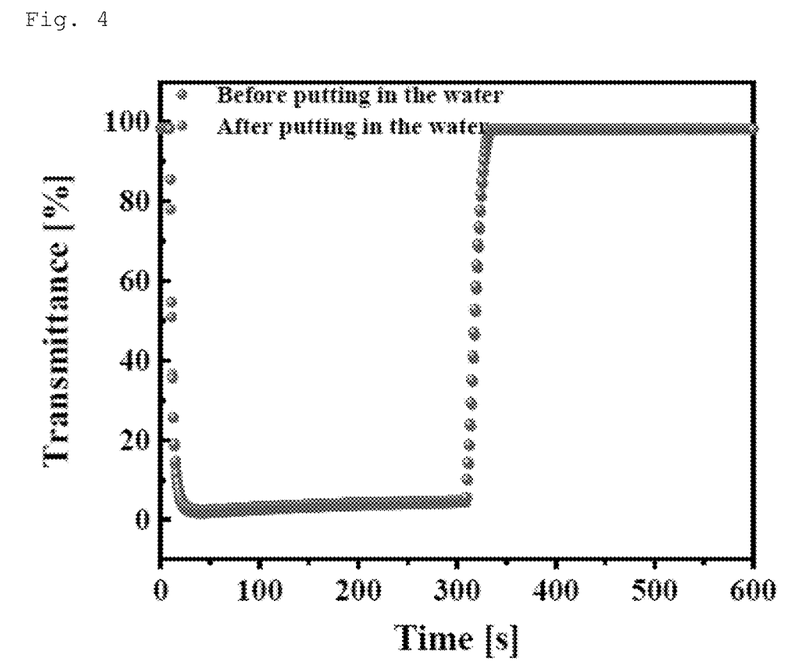
FIG. 4 is a graph showing the water stability of a stretchable electrochromic device manufactured according to an embodiment of the present invention.

In order to evaluate the resistance to water of a stretchable electrochromic device manufactured according to the above example, the color changing element was immersed in water and the volume change thereof in accordance therewith was measured and shown in FIG. 3, and the transmittance over time was measured and shown in FIG. 4.

As shown in FIG. 3, it has been confirmed that the stretchable electrochromic device manufactured according to the embodiment of the present invention did not change in volume even after having been immersed in water for about a day.

In addition, as shown in FIG. 4, it has been confirmed that the stretchable electrochromic device manufactured according to the embodiment of the present invention had little change in transmittance over time before and after the immersion in water.

It has been analyzed that this is because the stretchable electrochromic device according to the present invention is made of non-aqueous based materials.

Experimental Example 2. Evaluation of Optical Performance of Stretchable Electrochromic Device The transmittance over time before and after stretching the stretchable electrochromic device manufactured in the above example was measured and shown in FIG. 5.

Figure 5:
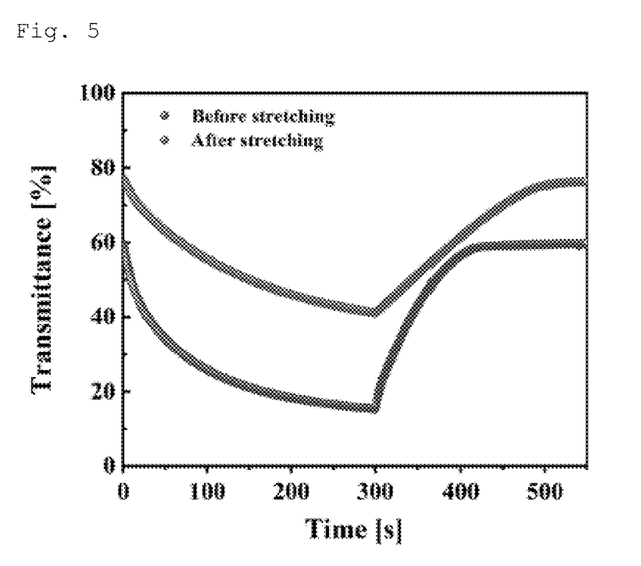
FIG. 5 is a graph obtained by measuring the transmittance over time of a stretchable electrochromic device manufactured according to an embodiment of the present invention.

As shown in FIG. 5, it has been confirmed that the initial transmittance increased when the stretchable electrochromic device was stretched.

Figure 6:
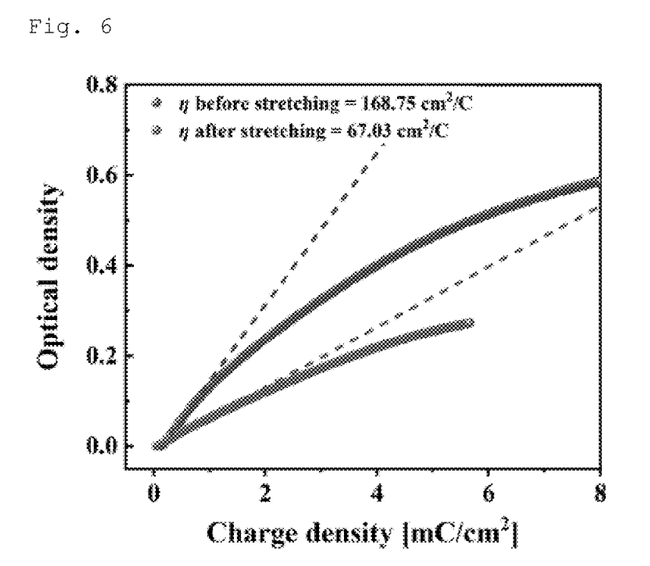
FIG. 6 is a graph obtained by measuring the optical density according to the charge density of a stretchable electrochromic device manufactured according to an embodiment of the present invention.

In addition, the optical density according to the charge density before and after stretching the stretchable electrochromic device manufactured in the above example was measured and shown in FIG. 6.

As shown in FIG. 6, it has been confirmed that the amount of change in color change, the rate of color change, and the rate of color fading decreased when the stretchable electrochromic device was stretched, which was analyzed to be due to an increase in the resistance of the electrode.

Experimental Example 3. Evaluation of Stability of Stretchable Electrochromic Device The stability was evaluated when the stretchable electrochromic device manufactured in the above example was deformed in various ways, and the results are shown in FIG. 7.

Figure 7:
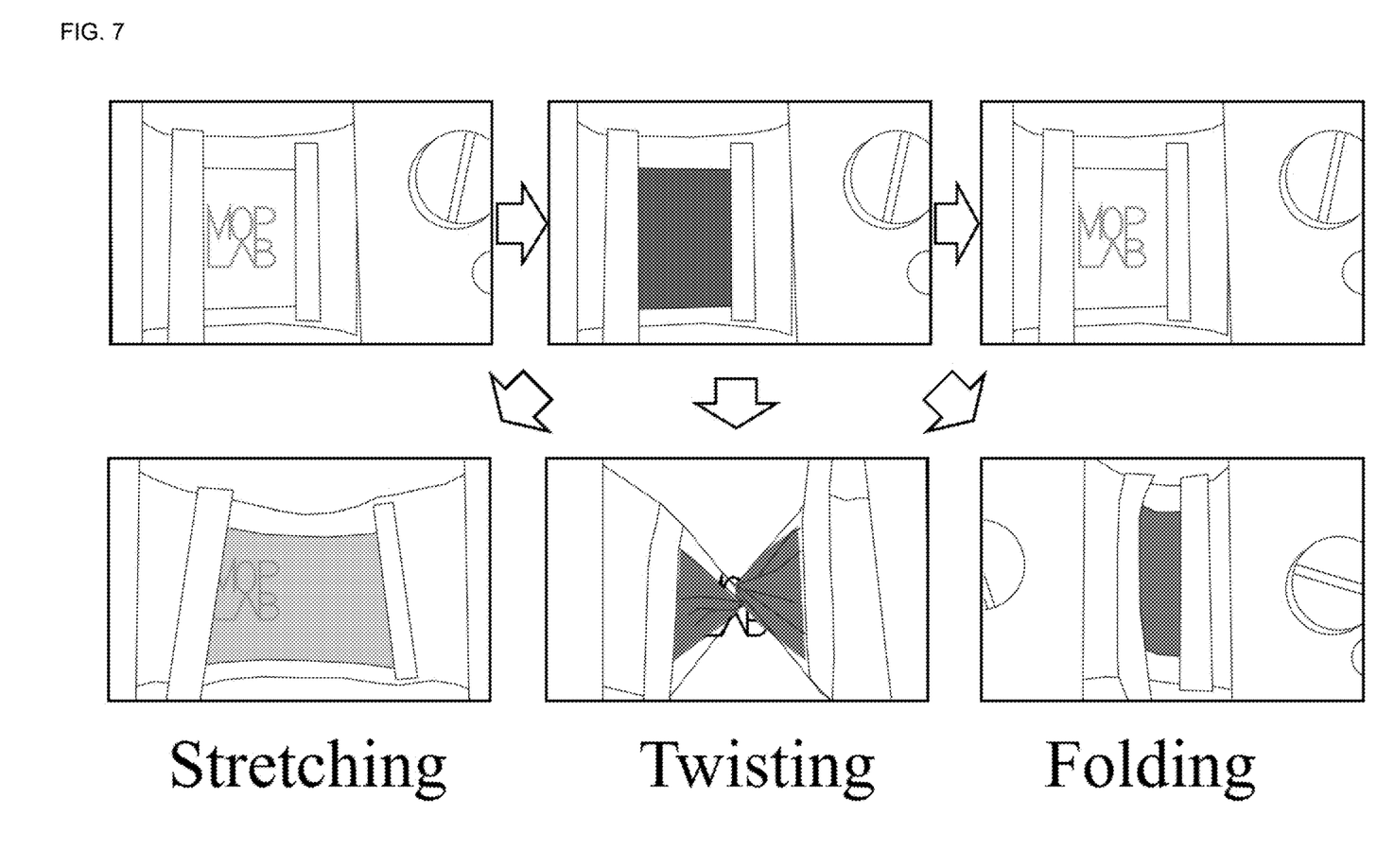
FIG. 7 is a photograph showing an example of the deformation of a stretchable electrochromic device manufactured according to an embodiment of the present invention.

As shown in FIG. 7, it has been confirmed that the stretchable electrochromic device manufactured according to the example of the present invention was stable even when deformed in various ways, and also, maintained the performance as a color changing element.

Although the present invention has been described in detail with preferred embodiments with reference to the drawings, the scope of the technical idea of the present invention is not limited to these drawings and embodiments. Therefore, there may be various modifications, or embodiments of an equivalent range within the scope of the technical idea of the present invention. The scope of the right of the technical idea according to the present invention should be interpreted by the claims, and the technical idea within a range equal to or equivalent to the claims should be interpreted as belonging to the scope of the right of the present invention.

The invention claimed is:

1. A method for manufacturing a stretchable electrochromic device, the method comprising:
   stretching polymer gel;
   coating a metal solution on one surface of the stretched polymer gel; and
   restoring the stretched polymer gel to its original state.

2. The method of claim 1, wherein
the polymer gel comprises a polymer resin, a plasticizer, an ionic liquid, a color changing material, and a reducing agent.

3. The method of claim 2, wherein
the polymer resin comprises a polymer resin selected from the group consisting of polyvinyl chloride (PVC), polytetrafluoroethylene (PTFE), polyurethane (PU), polymethyl methacrylate (PMMA), polydimethylsiloxane (PDMS), polyvinyl alcohol (PVA), polyvinylpyrrolidone (PVP), polyethylene oxide (PEO), polyimide (PI), polyethylene terephthalate (PET), and combinations thereof.

4. The method of claim 2, wherein
the ionic liquid comprises an ionic liquid selected from the group consisting of a neutral liquid, an anionic liquid, a cationic liquid, and combinations thereof.

5. The method of claim 4, wherein
the neutral liquid comprises a neutral liquid selected from the group consisting of 1-ethyl-3-methylimidazolium bis(trifluoromethylsulfonyl)imide (Emim TFSI), 1-methyl-3-propylimidazolium iodide (MPII), 1-ethyl-3-methylimidazolium tetrafluoroborate ($EMIBF_4$), 1-ethyl-3-methylimidazolium (EMIT), 1-ethyl-3-trifluoromethanesulfonate methylimidazolium hydrogensulfate ($EMIHSO_4$), N-methyl-N-butylpyrrolidinium bis(trifluoromethanesulfonyl)imide (PYRTFSI), and combinations thereof.

6. The method of claim 4, wherein
the anionic liquid comprises an anionic liquid selected from the group consisting of trifluoroacetate ($[tfa]^-$), trifluoromethanesulfonate ($[CF_3SO_3]^-$), bis(fluorosulfonyl)imide ($[N(SO_2F)_2]^-$), bis(trifluoromethanesulfonyl)imide ($[N(SO_2CF_3)_2]^-$), dicyanamide ($[N(CN)_2]^-$), tetracyanoborate ($[B(CN)_4]^-$), dihydrogenphosphate ($[H_2PO_4]^-$), hydrogen sulfate ($[HSO_4]^-$), and combinations thereof.

7. The method of claim 4, wherein
the cationic liquid comprises a cationic liquid selected from the group consisting of imidazolium, pyrrolidinium, piperidinium alkylmethylimidazolium, and combinations thereof.

8. The method of claim 2, wherein
based on 100 parts by weight of the polymer resin,
the content of the ionic liquid is 40 parts by weight to 140 parts by weight,
the content of the plasticizer is 300 parts by weight to 1,500 parts by weight, and
the contents of the color changing material and the reducing agent are respectively 10 parts by weight to 140 parts by weight.

9. The method of claim 1, wherein
the polymer gel is stretched by 20% to 80% with respect to the length of the polymer gel.

10. The method of claim 1, wherein
the metal solution comprises a solution of a metal selected from a group consisting of silver (Ag), gold (Au), platinum (Pt), palladium (Pd), iridium (Ir), rhodium (Rh), ruthenium (Ru), osmium (Os) and combinations thereof.

11. The method of claim 1, wherein the concentration of the metal solution is 1 mg/mL to 20 mg/mL.

12. The method of claim 1, wherein the method for manufacturing a stretchable electrochromic device further comprises,
after the coating of the metal solution on one surface of the stretched polymer gel,
spraying water on one surface of the polymer gel coated with the metal solution and performing annealing.

13. The method of claim 12, wherein the annealing is performed for 10 seconds to 1 minute.

14. The method of claim 1, wherein the restoring of the polymer gel to its original state is performed at a rate of 0.01 mm/s to 5.0 mm/s.

15. The method of claim 1, wherein the method for manufacturing a stretchable electrochromic device further comprises,
after the restoring of the stretched polymer gel to its original state,
performing the same processes on the other surface of the polymer gel.

16. A stretchable electrochromic device manufactured by the method for manufacturing a stretchable electrochromic device according to claim 1.

17. A product comprising the stretchable electrochromic device according to claim 16.

* * * * *